Aug. 18, 1936.   H. C. HOLDEN   2,051,602
INTERMITTENT MECHANISM FOR MOTION PICTURE APPARATUS
Filed Sept. 20, 1933

INVENTOR.
Harold C. Holden
BY
ATTORNEY.

Patented Aug. 18, 1936

2,051,602

UNITED STATES PATENT OFFICE 2,051,602

INTERMITTENT MECHANISM FOR MOTION PICTURE APPARATUS

Harold C. Holden, Woodbury, N. J., assignor to Radio Corporation of America, a corporation of Delaware Application September 20, 1933, Serial No. 690,177

3 Claims. (Cl. 88—18.4)

This invention relates to intermittent mechanisms for motion picture apparatus, and has for its principal object the provision of an improved intermittent mechanism fabricated from parts which are inexpensively manufactured and easily assembled in cooperative relationship without the necessity of skilled labor.

Another object is the provision of an intermittent mechanism which is automatically compensated for the wear incident to its operation.

A further object is the provision of an improved intermittent mechanism which operates smoothly and with a minimum of noise.

Various types of intermittent devices similar in some respects to that of the present invention have been proposed or utilized in the past. These devices, however, have not been altogether satisfactory for the reason that they are constructed at considerable expense and are likely to produce noise after their moving surfaces become worn. In accordance with this invention, the various parts of the device are separately fabricated, are arranged to be assembled on a single shaft, are provided with means for readily bringing them into proper alinement with one another, and are provided with resilient bearing surfaces which function to compensate for the wearing away of the surfaces during the operation of the device.

The invention will be better understood from the following description when considered in connection with the accompanying drawing, and its scope will be pointed out in the appended claims.

Referring to the drawing.

Figure 1:
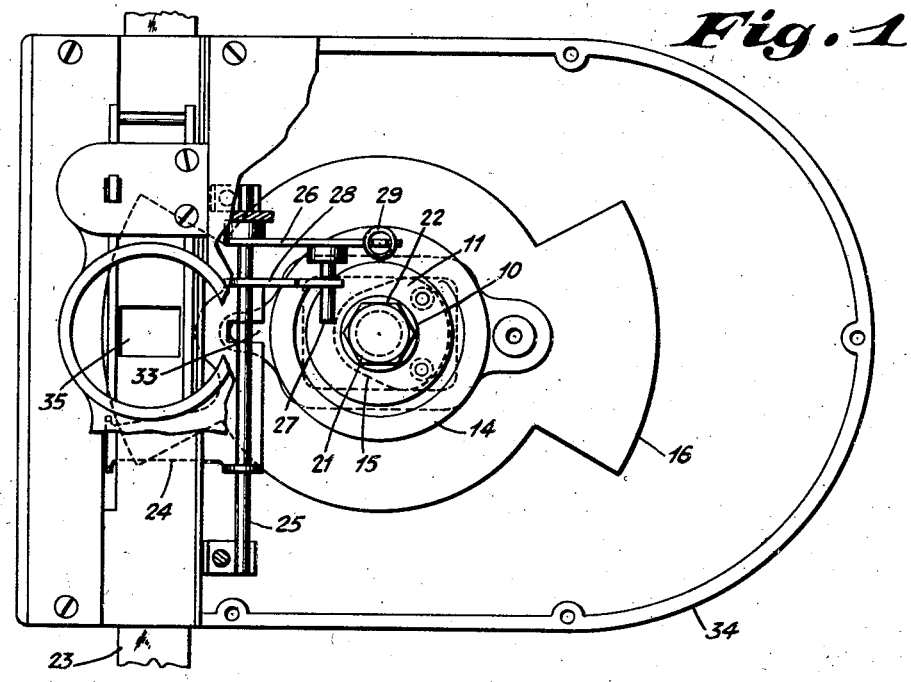
Fig. 1 illustrates a side view of the apparatus with the casing broken away and certain of the parts shown in section.

The mechanism includes a hollow shaft 10 provided at its left hand end with a collar 11 and arranged to receive a stub shaft 12 having at its right hand end a collar 13. Assembled on the shaft 10 are cams 14 and 15, a shutter 16, a driving gear 17 and collars 18 and 19. It will be observed that the members 14 to 19 are provided with openings 20 through which a pin may be passed for bringing them into proper angular alinement about the shaft 10. Under these conditions the members 14 to 19 are clamped between the collars 11 and 13 by means of a bolt 21 which is threaded into the end of the shaft 12 and is arranged to hold a washer 22 against the left hand end of this shaft.

Intermittent movement of the motion picture film 23 is effected by means of a claw member 24 arranged to oscillate about and slide to and fro along a stationary shaft 25. Oscillatory movement about the shaft 25 is imparted to the claw member 24 by means of the cam 14 which acts on this member through a lever 26, a pin 27 and the bifurcated extension 28 of the member 24. A spring 29 is interposed between a stationary part of the apparatus and the end of the lever 26 for biasing the claw member 24 into engagement with the film 23. Sliding movement of the member 24 along the shaft 25 is effected by means of the cam 15 and its co-operating yoke member 30, which is pivoted to a stationary support (not shown) at 31 and is provided at its left hand end with a pin 32 mounted in a slot 33 of the member 24. The device is mounted within a casing 34 and the picture aperture is shown at 35.

As will be readily understood, the shaft 12 extends beyond the collar 13 and is provided with a suitable bearing wherein it may be rotated by means of the driving gear 17. Rotary movement is imparted to the shutter 16 and to the cams 14 and 15 through the shafts 10 and 12. Due to the rotary movement of the cam 15, the member 24 is moved in one direction (for example downwardly) while in engagement with the film 23 and in the opposite direction while disengaged from this film. Engagement and disengagement of the member 24 with the film is of course produced by rotation of the cam 14.

Figure 2:
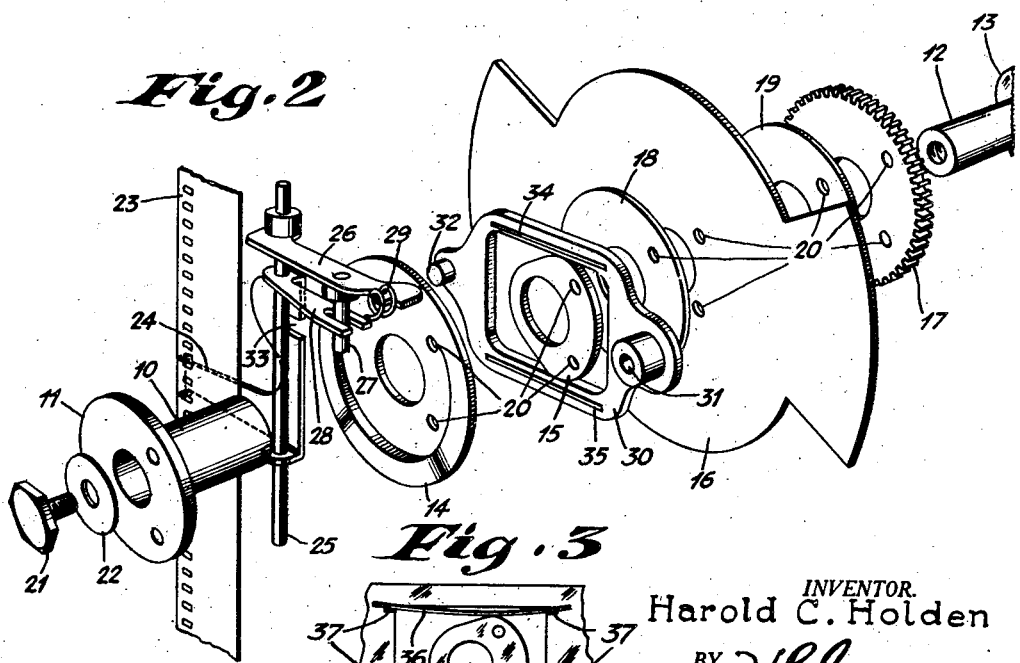
Fig. 2 is an exploded view of the mechanism.
Figure 3:
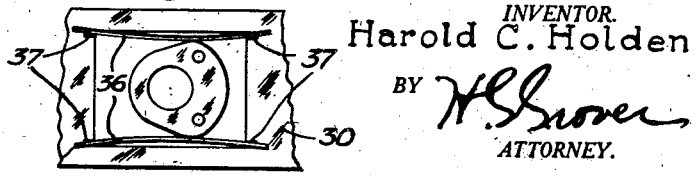
Fig. 3 illustrates a modified form of cam bearing.

In order to compensate for wear between the cooperating surfaces of the cam 15 and its yoke member 30, the upper and lower surfaces of this yoke member are made resilient so that they exert a pressure on the cam. This resilient pressure on the cam may be produced by slotting the member 30 at 34 and 35 as indicated in Fig. 2, by mounting spring members 36 on the inner surfaces of the yoke as indicated by Fig. 3 or in any other suitable manner.

It will be apparent that the ends of the springs 36 may be bifurcated to fit into the slots 37 of the member 30 and to be retained in operating position by means of the extensions at the sides of the cut away end portions. The springs 29 and 36, of course, tend to compensate for any wear that occurs between the cam 14 and the end of the lever 26 and between the cam 15 and the yoke 30. It therefore follows that the device may be constructed inexpensively, is readily assembled and is not rendered noisy as a result of wear.

Having thus described my invention, I claim:

1. A moving picture intermittent mechanism including a hollow shaft, a driving gear, a shutter and a pair of cams mounted on said shaft and provided with openings for alining them in predetermined angular relationship with one another, a film moving member, means arranged to cooperate with said cams for imparting longitudinal and transverse motion to said film moving member, a bearing shaft mounted within said hollow shaft, and means holding said hollow shaft on said bearing shaft and retaining the shutter and cams in assembled position.

2. A moving picture intermittent mechanism including a hollow shaft, a driving gear, a pair of cams mounted on said shaft and provided with openings for alining them in predetermined angular relationship with one another, a film moving member, means arranged to cooperate with said cams for imparting longitudinal and transverse motion to said film moving member, a bearing shaft mounted within said hollow shaft, and a single means holding said hollow shaft on said bearing shaft and retaining the shutter and cams in assembled position.

3. A moving picture intermittent mechanism including a hollow shaft, a pair of cams mounted on said shaft and provided with openings for alining them in predetermined angular relationship with one another, a film moving member, means arranged to cooperate with said cams for imparting longitudinal and transverse motion to said film moving member, a bearing shaft mounted within said hollow shaft, and means holding said hollow shaft on said bearing shaft and retaining said cams in assembled position on said hollow shaft.

HAROLD C. HOLDEN.